(12) United States Patent
Ko

(10) Patent No.: US 9,120,471 B2
(45) Date of Patent: Sep. 1, 2015

(54) OIL PIPE CONNECTION DEVICE FOR A HYDRAULIC BRAKE

(71) Applicant: LEE CHI ENTERPRISES CO., LTD., Changhua (TW)

(72) Inventor: Shih-Ching Ko, Changhua (TW)

(73) Assignee: LEE CHI ENTERPRISES CO., LTD., Changhua (TW)

( * ) Notice: Subject to any disclaimer, the term of this patent is extended or adjusted under 35 U.S.C. 154(b) by 0 days.

(21) Appl. No.: 14/093,585

(22) Filed: Dec. 2, 2013

(65) Prior Publication Data

US 2014/0152004 A1 Jun. 5, 2014

(30) Foreign Application Priority Data

Dec. 5, 2012 (TW) .............................. 101223582 U

(51) Int. Cl.
*F16L 33/00* (2006.01)
*B60T 17/04* (2006.01)

(52) U.S. Cl.
CPC .................................. *B60T 17/043* (2013.01)

(58) Field of Classification Search
USPC ......... 285/213, 246, 250, 256, 255, 384, 385, 285/353, 393, 249
See application file for complete search history.

(56) References Cited

U.S. PATENT DOCUMENTS

| | | | | | |
|---|---|---|---|---|---|
| 1,862,833 | A | * | 6/1932 | Stover | 285/249 |
| 2,321,260 | A | * | 6/1943 | Stecher | 285/249 |
| 3,025,086 | A | * | 3/1962 | Mosely | 285/250 |
| 4,614,372 | A | * | 9/1986 | Gschwind | 285/356 |
| 5,709,413 | A | * | 1/1998 | Salyers | 285/219 |
| 7,644,958 | B2 | * | 1/2010 | Postler | 285/249 |

* cited by examiner

*Primary Examiner* — Aaron Dunwoody
(74) *Attorney, Agent, or Firm* — Alan D. Kamrath; Kamrath IP Lawfirm, P.A.

(57) ABSTRACT

An oil pipe connection device has a base, an oil pipe, a pipe connector and a securing nut. The base has a connection hole and an abutting shoulder. The pipe connector is mounted in the connection hole and has a tapered head, an insertion segment, a pressing collar and an engaging recess. The tapered head abuts with the abutting shoulder. The insertion segment is inserted tightly into an end of the oil pipe. The pressing collar is around the insertion segment and has an inclined guiding surface. The engaging recess is formed between the pressing collar and the insertion segment and holds the end of the oil pipe inside. The securing nut is mounted around the oil pipe, is connected with the connection hole in a threaded manner and has an inclined guiding surface abutting with the inclined guiding surface on the pressing collar.

13 Claims, 6 Drawing Sheets

OIL PIPE CONNECTION DEVICE FOR A HYDRAULIC BRAKE

BACKGROUND OF THE INVENTION

1. Field of the Invention

The present invention relates to a hydraulic brake of a bicycle and, more particularly, to an oil pipe connection device for a hydraulic brake of a bicycle and having a simplified structure and an excellent sealing effect.

2. Description of Related Art

A hydraulic brake device for a bicycle substantially comprises a brake lever, a disk brake and an oil pipe. The brake lever is mounted on a handlebar of the bicycle, and the disk brake is mounted on a side of a wheel of the bicycle. The oil pipe is connected between the brake lever and the disk brake to lead oil from the brake lever to the disk brake to provide a braking effect to the wheel. To connect the oil pipe securely with the brake lever or disk brake, different connection devices are provided.

With reference to FIG. 6, a conventional connection device 90 for an oil pipe comprises a base 80, an oil pipe 91, a pipe connector 92, a pressing ring 93 and a securing nut 94. The base 80 is formed as a part of a brake lever and has a connection hole 81 formed in the base 80. The oil pipe 91 is connected with the base 80. The pipe connector 92 is inserted into the oil pipe 91 and has a head 922, an insertion segment 921 and an O-ring 924. The head 922 is formed on one end of the pipe connector 92 and has an annular groove 923 defined around the head 922. The insertion segment 921 is formed on and protrudes from one side of the head 922, is inserted into the oil pipe 91 and is composed of multiple conical collars. The O-ring 924 is mounted in the annular groove 923 in the head 922. The pressing ring 93 is mounted around the oil pipe 91. The securing nut 94 is screwed with the connection hole 81 in the base 80 and holds the pressing ring 93 inside. With the securing nut 94 and the clamping effect provided by the pressing ring 93, the oil pipe 91 is connected with the connection hole 81 in the base 80. The O-ring 924 provides a sealing effect to prevent the oil in the base 80 from leaking.

However, the conventional connection device 90 has the following drawbacks.

1. The conventional connection device 90 composed of a pipe connector 92, an O-ring 924 and a pressing ring 93 has a lot of components, so to assemble the conventional connection device 90 is laborious and troublesome. The cost for manufacturing and assembling the conventional connection device 90 is high, and some component may be easily missed or assembled in an opposite direction.

2. The O-ring 924 is made of a rubber material but is easily deformed or broken during the assembling process of the conventional connection device 90 if interference between the components occurs. The sealing effect provided by the O-ring 924 is easily lost due to becoming aged or deteriorated after a period of use.

3. The O-ring 924 is mounted in the annular groove 923 in the head 922 of the pipe connector 92, but the size of the pipe connector 92 is relatively small. Therefore, to form the annular groove 923 in the head 922 of the small pipe connector 92 is difficult, and the O-ring 924 is easily detached from the annular groove 923 to lose the sealing effect.

To overcome the shortcomings, the present invention provides an oil pipe connection device to mitigate or obviate the aforementioned problems.

SUMMARY OF THE INVENTION

The main objective of the invention is to provide an oil pipe connection device that has a simplified structure, is easily assembled and can provide an excellent sealing effect.

The oil pipe connection device has a base, an oil pipe, a pipe connector and a securing nut. The base has a connection hole and a bottom hole. The connection hole is defined in the base and has a diameter, an inner surface, a bottom surface and an inner thread. The inner thread is formed in the inner surface. The bottom hole is defined in the bottom surface and has a diameter smaller than the diameter of the connection hole to form an abutting shoulder between the connection hole and the bottom hole. The oil pipe is connected with the base and has an end mounted in the connection hole. The pipe connector is mounted in the connection hole and has a tapered head, an insertion segment, a pressing collar and an engaging recess. The tapered head is formed on a first end of the pipe connector and abuts with the abutting shoulder in the connection hole. The insertion segment is formed on and extends from a second end of the pipe connector and is inserted tightly into an end of the oil pipe. The pressing collar is formed on the second end of the pipe connector around the insertion segment, is mounted around the end of the oil pipe into which the insertion segment is inserted and has an inclined guiding surface formed on an end of the pressing collar away from the tapered head. The engaging recess is formed between the pressing collar and the insertion segment and holds the end of the oil pipe into which the insertion segment is inserted inside. The securing nut is mounted around the end of the oil pipe into which the insertion segment is inserted, is connected with the connection hole in a threaded manner and has an outer thread and an inclined guiding surface. The outer thread is screwed with the inner thread of the connection hole. The inclined guiding surface is formed in an inner surface of an end of the securing nut and abutting with the inclined guiding surface on the pressing collar.

Other objectives, advantages and novel features of the invention will become more apparent from the following detailed description when taken in conjunction with the accompanying drawings.

BRIEF DESCRIPTION OF THE DRAWINGS

FIG. 3A is an enlarged cross sectional side view of the oil pipe connection device in FIG. 3;

DETAILED DESCRIPTION OF PREFERRED EMBODIMENT EMBODIMENTS

Figure 1:
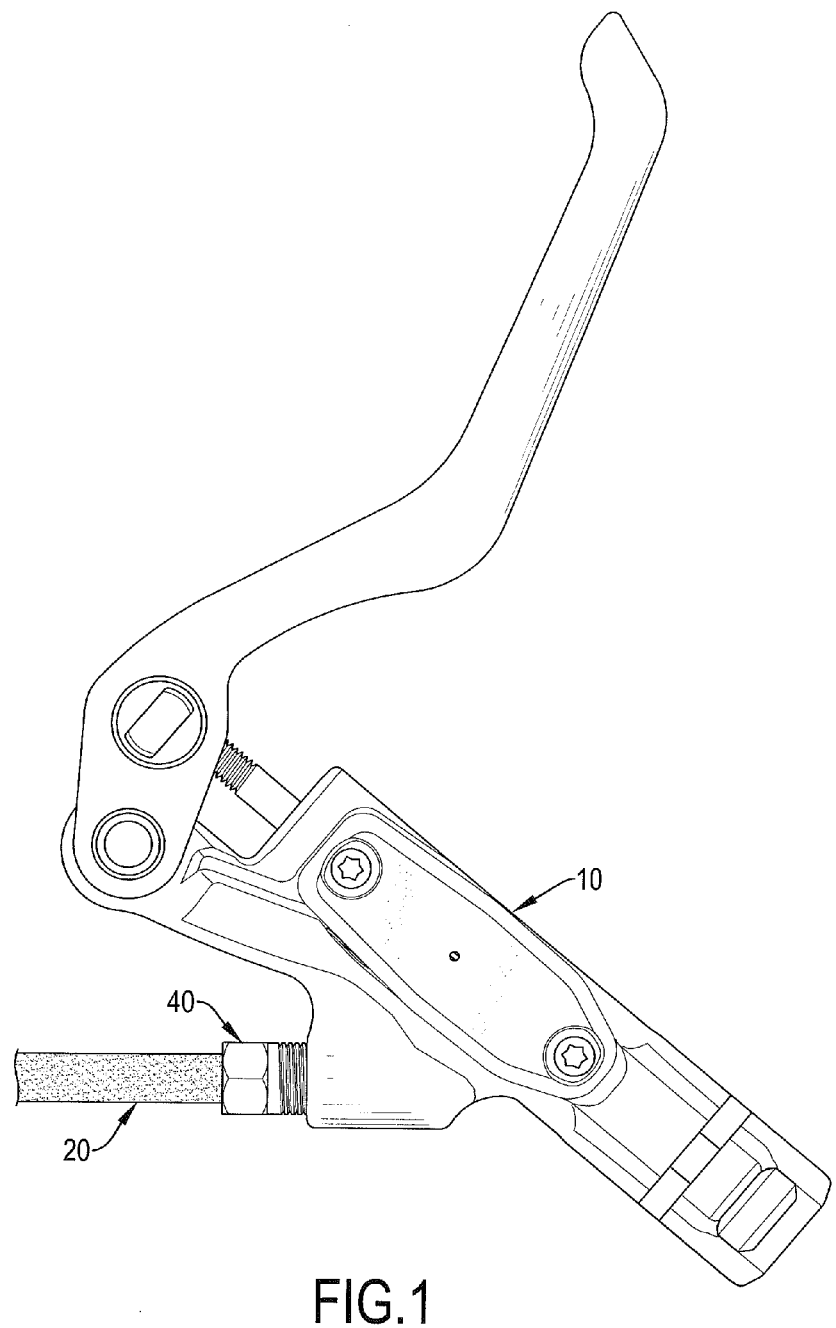
FIG. 1 is a top view of an oil pipe connection device in accordance with the present invention mounted on a brake lever of a hydraulic brake.

With reference to FIG. 1, an oil pipe connection device in accordance with the present invention can be applied to a brake lever or a disk brake of a hydraulic brake for a bicycle.

With reference to FIGS. 1 to 5, the oil pipe connection device comprises a base 10, an oil pipe 20, a pipe connector 30 and a securing nut 40.

Figure 2:
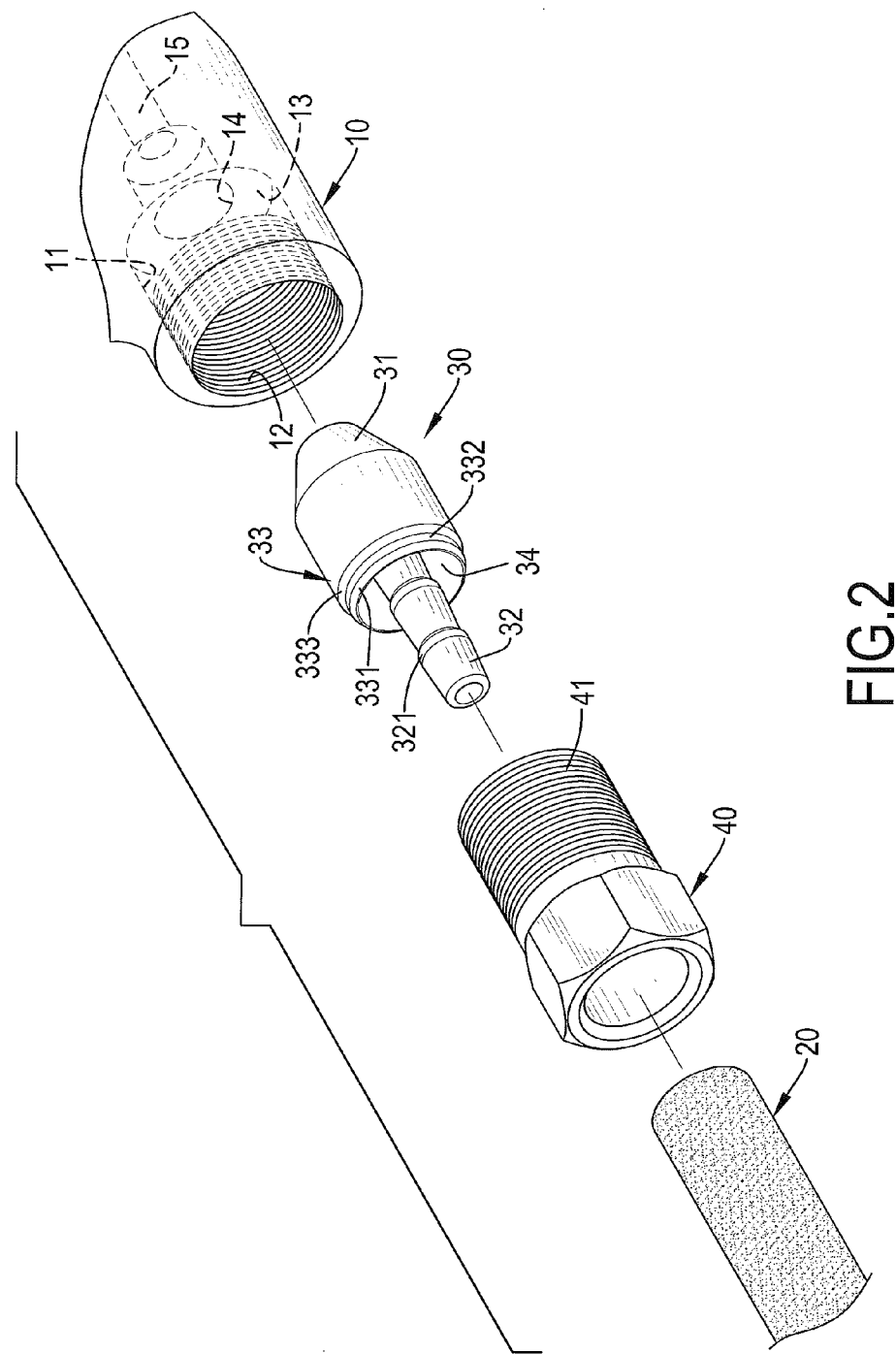
FIG. 2 is an exploded perspective view of the oil pipe connection device in FIG. 1.
Figure 3:
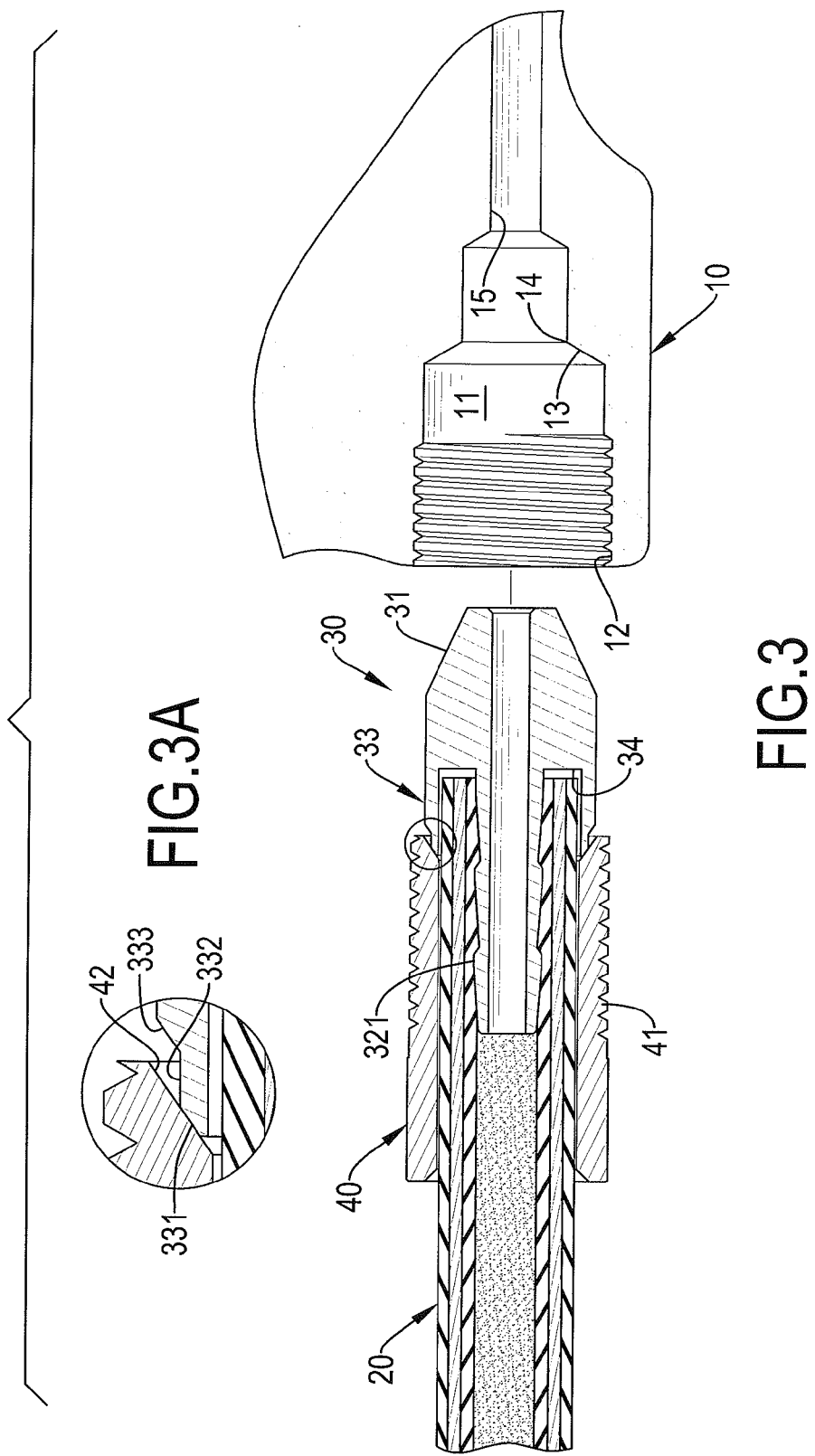
FIG. 3 is a side view in partial section of the oil pipe connection device in FIG. 2.

With reference to FIGS. 2 and 3, the base 10 may be metal and has a hole in multiple stepped segments. The base 10 has a connection hole 11, a bottom hole, a conical surface 13 and an oil passage 15. The connection hole 11 is defined in the base 10 and has a diameter, an inner surface, a bottom surface and an inner thread 12 formed in the inner surface. The bottom hole is defined in the bottom surface of the connection hole 11 and has a diameter and a bottom surface. The diameter of the bottom hole is smaller than the diameter of the connection hole 11 to form an abutting shoulder 14 between the connection hole 11 and the bottom hole. The conical surface 13 is formed between the connection hole 11 and the abutting shoulder 14. The oil passage 15 is defined in the bottom surface of the bottom hole.

The oil pipe 20 is connected with the base 10 and has an end mounted in the connection hole 11.

The pipe connector 30 may be metal, is formed as a single part, is mounted in the connection hole 11 and has a diameter smaller than that of the connection hole 11. The pipe connector 30 comprises a tapered head 31, an insertion segment 32, a pressing collar 33 and an engaging recess 34. The tapered head 31 is formed on a first end of the pipe connector 30 facing the oil passage 15 and abuts with the abutting shoulder 14 in the base 10. The tapered head 31 has a front end having a diameter smaller than that of the bottom hole. The slope of the outer surface of the tapered head 31 relative to a central axis is smaller than a slope of the conical surface 13 of the base 10 relative to the central axis. The insertion segment 32 is formed on and extends from a second end of the pipe connector 30 opposite to the oil passage 15 and has a diameter slightly larger than an inner diameter of the oil pipe 20. Preferably, the insertion segment 32 is composed of multiple conical collars, and each conical collar has a flat guiding surface 321 formed one an end of the conical collar. Thus, the insertion segment 32 can be inserted tightly into an end of the oil pipe 20. The pressing collar 33 is formed on the second end of the pipe connector 30 opposite to the oil passage 15 and around the insertion segment 32. The pressing collar 33 has a length shorter than that of the insertion segment 32 and an inner diameter substantially equal to an outer diameter of the oil pipe 20. Preferably, the pressing collar 33 has a stepped outer surface formed on the end of the pressing collar 33 away from the tapered head 31, and the stepped outer surface comprises an inclined guiding surface 331, an alignment flat surface 332 and an inclined pressing surface 333 formed in sequence toward the tapered head 31. The engaging recess 34 is formed between the pressing collar 33 and the insertion segment 32 and holds the end of the oil pipe 20 into which the insertion segment 32 is inserted inside.

The securing nut 40 is metal, is axially hollow and has an inner diameter substantially equal to the outer diameter of the oil pipe 20. The securing nut 40 is mounted around the end of the oil pipe 20 into which the insertion segment 32 is inserted and is connected with the connection hole 11 in a threaded manner. The securing nut 40 has an outer thread 41 and an inclined guiding surface 42. The outer thread 41 is formed on an end of the securing nut 40 facing the connection hole 11 and is screwed with the inner thread 12 of the connection hole 11. The inclined guiding surface 42 is formed in an inner surface of the end of the securing nut 40 on which the outer thread 41 is formed and abuts with the inclined guiding surface 331 on the pressing collar 33.

Figure 4:
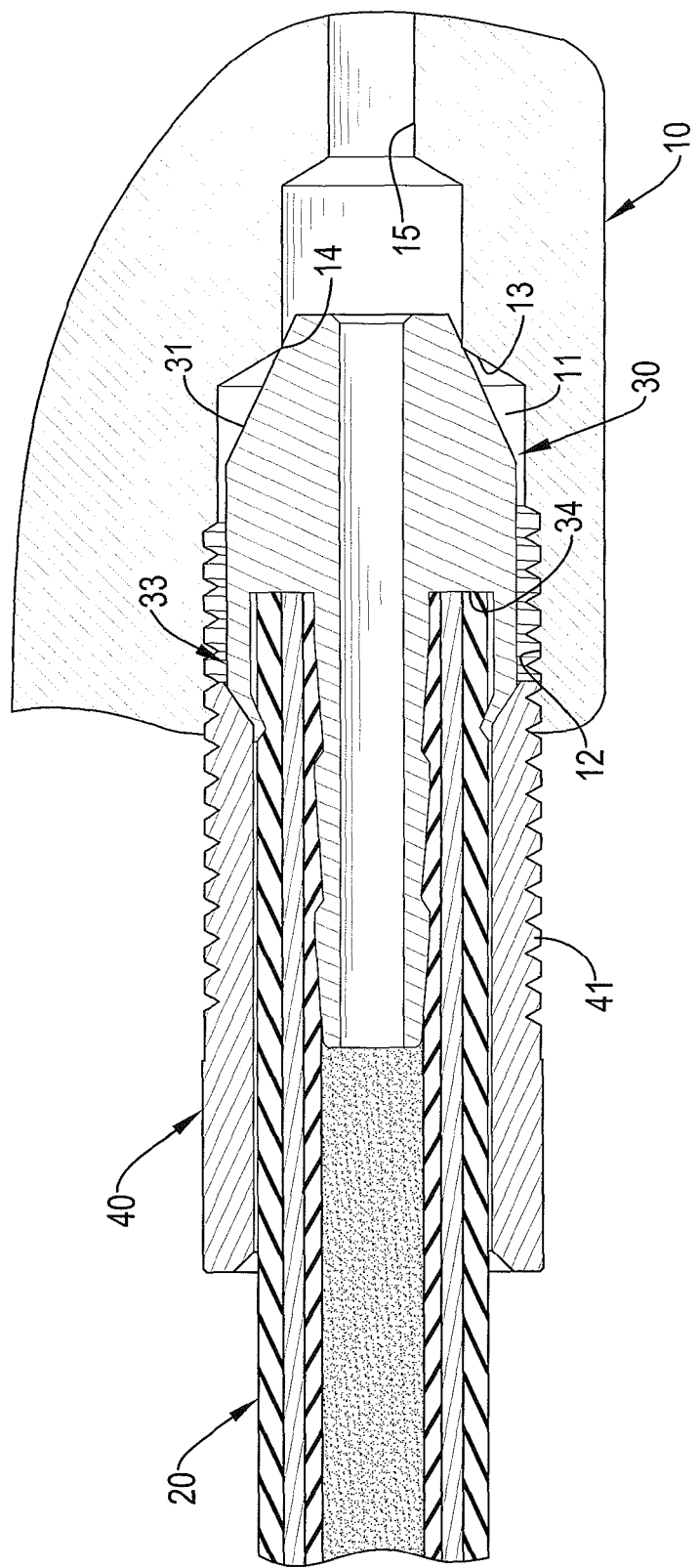
FIG. 4 is an enlarged operational side view in partial section of the oil pipe connection device in FIG. 2 showing the first stage of the assembling process for the connection device.
Figure 5:
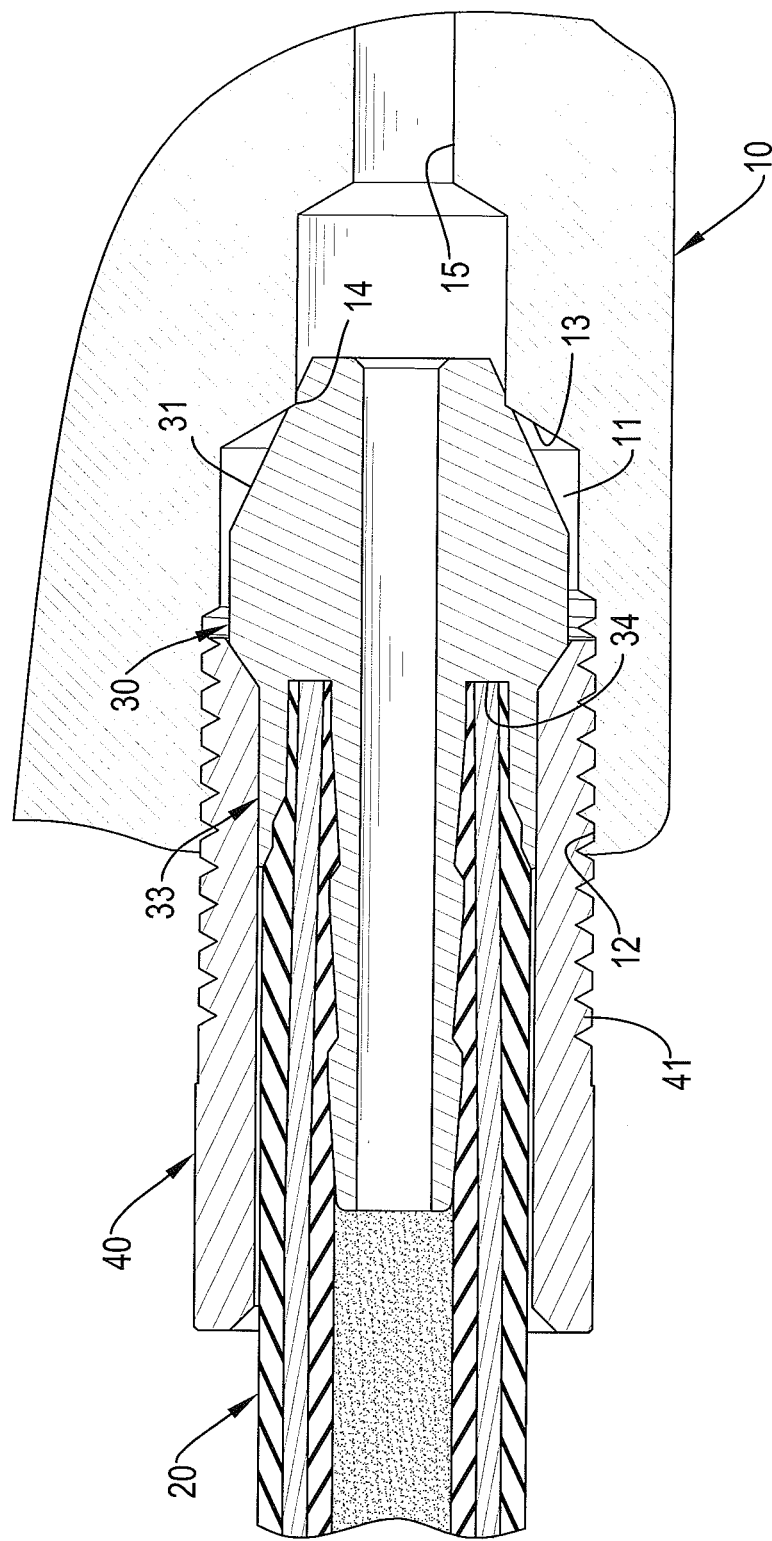
FIG. 5 is an enlarged operational side view in partial section of the oil pipe connection device in FIG. 2 showing the second stage of the assembling process for the connection device.
Figure 6:
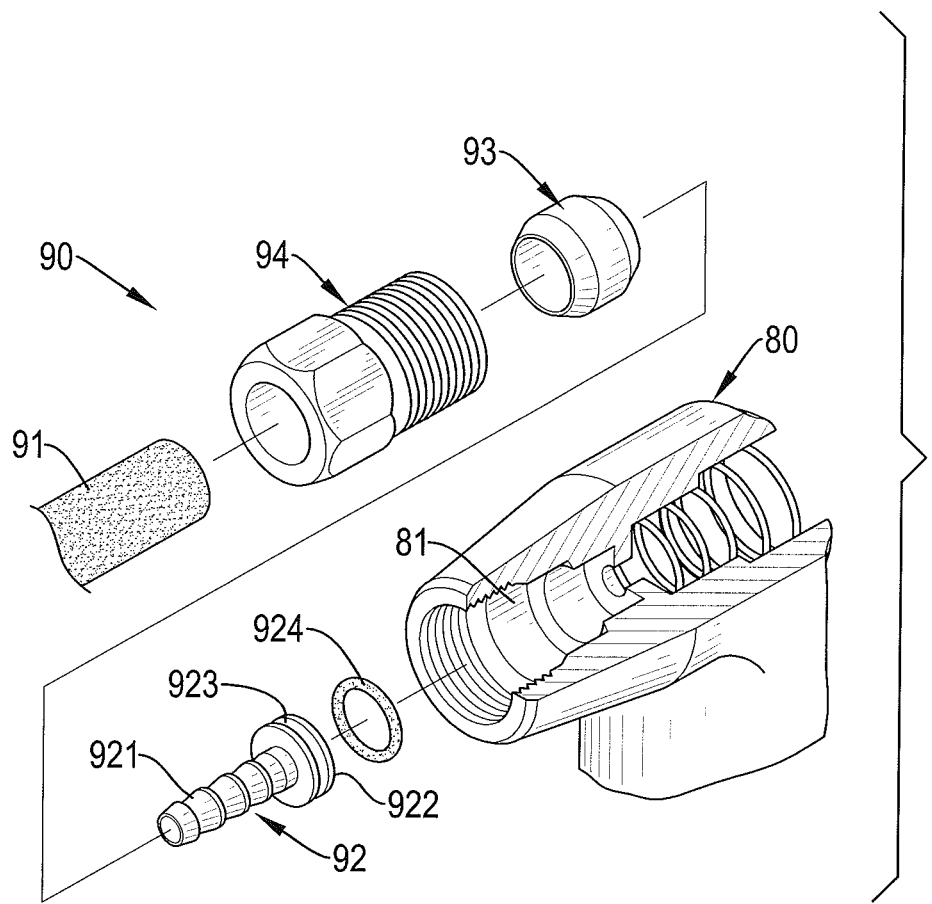
FIG. 6 is an exploded perspective view of a conventional connection device.

With reference to FIGS. 3 to 5, to assemble the oil pipe connection device in accordance with the present invention, the securing nut 40 is pressed onto around an end of the oil pipe 20 in a tight manner, and the insertion segment 32 of the pipe connector 30 is inserted into the end of the oil pipe 20. Thus, the end of the oil pipe 20 is held and engaged in the engaging recess 34. Then, the pipe connector 30 is inserted into the connection hole 11, and the securing nut 40 is rotated to screw with the connection hole 11 by the outer thread 41 and the inner thread 12. When the securing nut 40 is screwed with the connection hole 11, the oil pipe 20 is moved forward and tightly engages into the engaging recess 34. With the guiding effect provided by the inclined guiding surfaces 331, 42 on the pressing collar 33 and the securing nut 40, the alignment flat surface 332 on the pressing collar 33 will be smoothly deformed and bent to clamp the oil pipe 20 while the securing nut 40 is moved into the connection hole 11. Accordingly, the oil pipe 20 and the pipe connector 30 can be initially positioned as shown in FIG. 4.

The securing nut 40 is further rotated by a tool, and the inclined pressing surface 333 of the pressing collar 33 can be forced to deform and clamp the oil pipe 20 while the securing nut 40 is moved further into the connection hole 11. The tapered head 31 will be forced to abut against the abutting shoulder 14, and the tapered head 31 and the abutting shoulder 14 will be deformed and engage was tightly each other. Accordingly, the oil pipe 20 can be securely connected with the connection hole 11.

With reference to FIG. 5, with the arrangement of the pipe connector 30, the number of components of the connection device can be reduced, such that the connection device has a simplified structure. To assemble the connection device is labor-saving at a lowered cost. Assembling components in an opposite direction or missing parts can be effectively prevented.

The metal tapered head 31 and abutting shoulder 14 can be forced to deform and engage tightly with each other while the securing nut 40 is moved into the connection hole 11, the oil pipe 20 can be securely connected with the connection hole 11, and an excellent sealing effect is provided. Furthermore, with the arrangement of the inclined guiding surface 331, the alignment flat surface 332 and the inclined pressing surface 333 on an end of the pressing collar 33, the oil pipe 20 can be initially positioned by two stages of deformation of the pressing collar 33, and the components of the connection device can be assembled co-axially.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An oil pipe connection device for a hydraulic brake comprising:
 a base having:
  a connection hole defined in the base and having
   a diameter;
   an inner surface;
   a bottom surface; and
   an inner thread formed in the inner surface; and
  a bottom hole defined in the bottom surface and having
   a diameter smaller than the diameter of the connection hole to form an abutting shoulder between the connection hole and the bottom hole;

an oil pipe connected with the base and having an end mounted in the connection hole;

a pipe connector mounted in the connection hole and having:

a tapered head formed on a first end of the pipe connector and abutting with the abutting shoulder;

an insertion segment formed on and extending from a second end of the pipe connector and inserted tightly into an end of the oil pipe;

a pressing collar formed on the second end of the pipe connector around the insertion segment, having an inner surface mounted around the end of the oil pipe into which the insertion segment is inserted and received in the inner surface of the connection hole;

an inclined guiding surface, an alignment flat surface and an inclined pressing surface formed in sequence toward the tapered head and on the end of the pressing collar away from the tapered head, with the inclined pressing surface intermediate the alignment flat surface and the pressing collar; and an engaging recess formed between the pressing collar and the insertion segment and holding the end of the oil pipe into which the insertion segment is inserted inside; and a securing nut mounted around the end of the oil pipe into which the insertion segment is inserted, connected with the connection hole in a threaded manner and having:

an outer thread screwed with the inner thread of the connection hole; and an inclined guiding surface formed in an inner surface of an end of the securing nut and abutting with the inclined guiding surface on the pressing collar.

2. The oil pipe connection device as claimed in claim 1, wherein the base further has a conical surface formed between the connection hole and the abutting shoulder.

3. The oil pipe connection device as claimed in claim 2, wherein a slope of an outer surface of the tapered head of the pipe connector is smaller than a slope of the conical surface of the base.

4. The oil pipe connection device as claimed in claim 3, wherein the pipe connector is metal.

5. The oil pipe connection device as claimed in claim 4, wherein:

the insertion segment is composed of multiple conical collars; and each conical collar has a flat guiding surface formed one an end of the conical collar.

6. The oil pipe connection device as claimed in claim 2, wherein the pipe connector is metal.

7. The oil pipe connection device as claimed in claim 6, wherein:

the insertion segment is composed of multiple conical collars; and each conical collar has a flat guiding surface formed one an end of the conical collar.

8. The oil pipe connection device as claimed in claim 1, wherein:

the insertion segment is composed of multiple conical collars; and each conical collar has a flat guiding surface formed one an end of the conical collar.

9. The oil pipe connection device as claimed in claim 1, wherein the pipe connector is metal.

10. The oil pipe connection device as claimed in claim 9, wherein:

the insertion segment is composed of multiple conical collars; and each conical collar has a flat guiding surface formed one an end of the conical collar.

11. The oil pipe connection device as claimed in claim 1, wherein the pressing collar has a constant cross section intermediate the tapered head and the inclined pressing surface.

12. The oil pipe connection device as claimed in claim 11, wherein the inclined guiding surface, the alignment flat surface and the inclined pressing surface are formed on an outer surface of the pipe connector.

13. The oil pipe connection device as claimed in claim 1, wherein the inclined guiding surface has increasing cross sectional size approaching the alignment flat surface; and wherein the inclined pressing surface has increasing cross sectional size extending away from the alignment flat surface.

* * * * *